June 15, 1954     E. C. SEARLS     2,681,126
LUBRICATION OF GEARING
Filed March 26, 1951     2 Sheets-Sheet 1
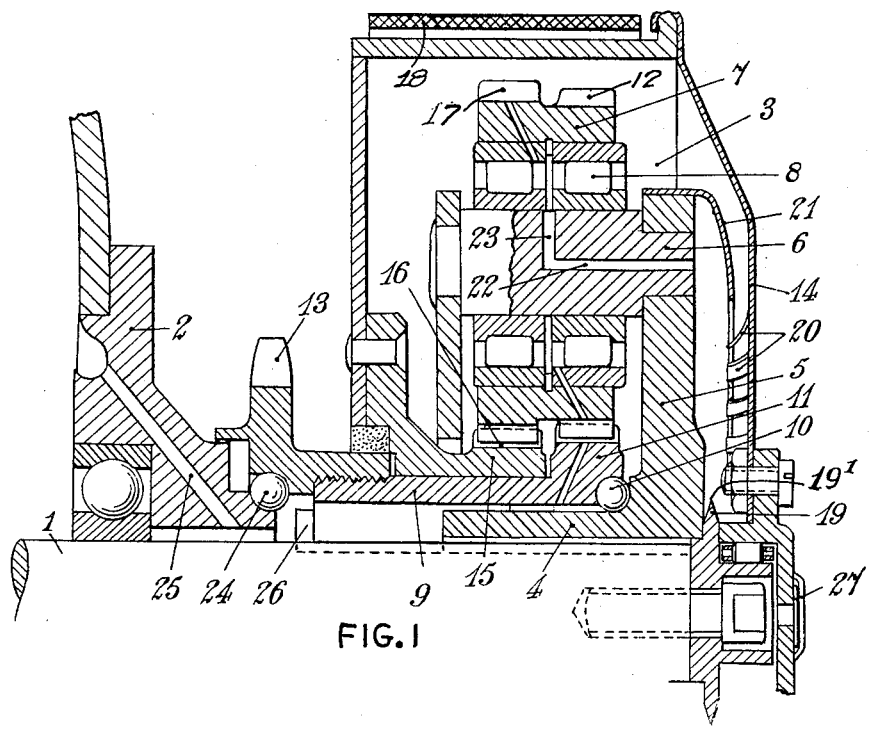
FIG. 1
FIG. 2
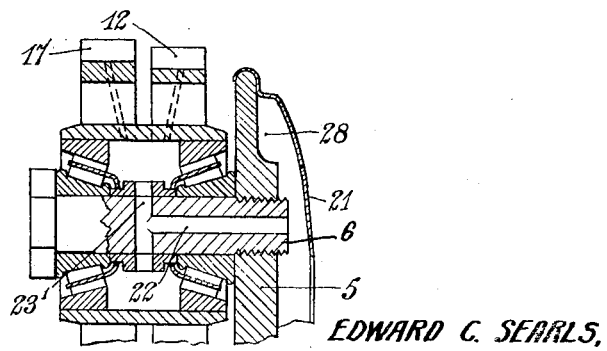
EDWARD C. SEARLS,
INVENTOR
BY
ATTORNEY

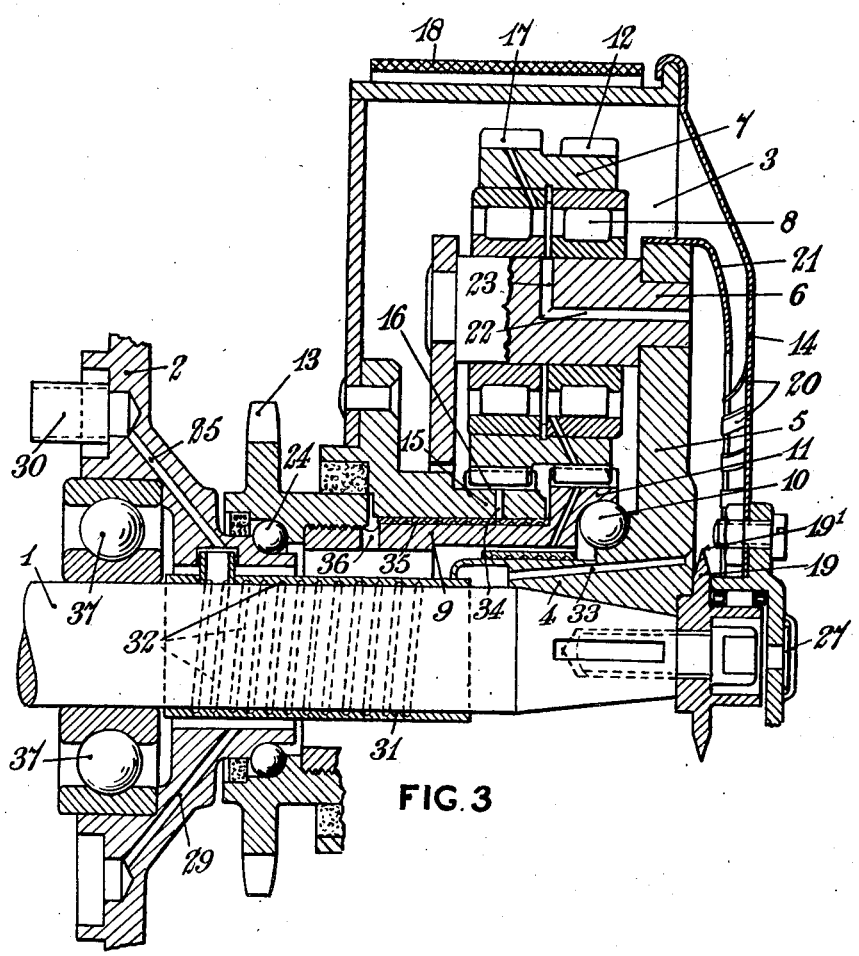

Patented June 15, 1954

2,681,126

UNITED STATES PATENT OFFICE 2,681,126

LUBRICATION OF GEARING

Edward Charles Searls, Blackheath, London, England

Application March 26, 1951, Serial No. 217,473

4 Claims. (Cl. 184—6)

This invention is concerned with the lubrication of gearing and especially though not exclusively with the lubrication of change speed gearing of the sun and planet type.

The object of the present invention is to provide means for the lubrication of gearing such as that previously mentioned, and in particular, to provide for the distribution of the lubricant to the parts of the gearing. Another object is to maintain a supply of lubricant to the gear box of the gearing from the crank case of the engine driving the gearing, and further to arrange for the surplus oil in the gear box to return to the crank case, the passages for the flow of lubricant to and from the gear box being arranged adjacent the driving shaft of the gearing, thus making it possible to effectively lubricate gearing of the sun and planet type in which the casing of the gearing revolves.

A further object is to utilise the differential air pressures in the crank case of the engine to promote the flow of oil laden air from the crank case to the gear box, and to assist the flow of such air by providing in the gear box a breathing valve through which the air may escape after depositing all or most of its oil content within the gear box.

According to the present invention there is provided in a gear box for an engine the combination of a rotatable casing for the gear box, a driving shaft extending from the engine crank case centrally into the gear box, a driven member, co-axial with the driving shaft and projecting from the gear box, a gear wheel assembly on the driving shaft the arrangement being such that the drive may be transmitted either to the rotatable casing for idling or to the driven member for working, oil throwing means on the driving shaft, deflectors on an inner wall of the casing to direct oil on to the oil throwing means, an annular oil receiving cup on the face of the gear wheel assembly positioned to receive oil thrown outwardly by the throwing means, ducts leading from the annular cup to the gear wheel bearings to distribute the oil whereby the oil within the gear box is circulated, oil inlet passages adjacent to the driving shaft connecting the crank case to the gear box whereby oil may pass from the crank case into the gear box to maintain the oil supply in the gear box and oil outlet passages adjacent to the driving shaft connecting the gear box to the crank case whereby excess of oil from the gear box may pass back into the crank case, the said inlet and outlet passages being so arranged that the oil passes into and out of the gear box between the driving shaft and the driven member.

In order that the invention may be clearly understood and readily carried into effect, reference is now directed to the accompanying drawings which show by way of example and in diagrammatic form various views of a gear box constructed according to the invention and suitable for use with a small powered engine. In the drawings Fig. 1 is a sectional view of a part of a gear box embodying the invention;

Figure 2 is a modification of the construction shown in Figure 1 using an oil receiving member of increased radius and having oil ducts in a screw threaded member;

Figure 3 is a sectional view of a part of a modified gear box embodying the invention showing a more positive way of maintaining the oil level in the gear box means being provided for the return of surplus oil to the crank case.

Referring to Figure 1, 1 is the crank or driving shaft of an engine (not shown) extending from the crank case 2 into the gear box 3. Keyed on to the shaft 1 is a sleeve 4 provided with a flange 5 at the outer end thereof which carries an auxiliary shaft 6 upon which a compound gear wheel 7 is mounted on bearings 8. Loosely mounted on the sleeve 4 is a cylindrical member 9 supported by a bearing 10 and provided with a gear wheel 11 meshing with a part 12 of the compound gear wheel 7. A sprocket member 13 is in screw threaded or other engagement with the end of the cylindrical member 9 and this sprocket is connected through suitable intermediate means to the road wheels of the truck or the like. Obviously if desired there may be more than one auxiliary shaft 6 and in fact I prefer to employ three such shafts disposed at an angle of 120° to one another. In this arrangement therefore the three shafts 6 each with a compound gear wheel 7 will be disposed around the crank shaft 1.

The gear box 3 is provided with a casing 14 having an inwardly projecting sleeve 15 surrounding the cylindrical member 9 and at the end of the sleeve 15 a gear wheel 16 is provided to mesh with the other part 17 of the compound gear wheel 7. A brake band 18 is provided to embrace the outside of the gear box casing 14.

In operation the shaft 1 is rotated by the engine and the sleeve 4 is rotated therewith. The teeth of the gear wheels 11, 12 and 16, 17 are so arranged numerically that a drive at a reduced speed is transmitted either to the sprocket 13 or to the gear box casing 14 whichever offers the least resistance. This may be effected for example by providing the gear wheels 11 and 17 with 38 teeth and the gear wheels 12 and 16 with 37 teeth. When the engine is running and the truck or other device is stationary the resistance offered by the road wheels on the sprocket 13 is greater than the resistance of the casing 14 and the casing is therefore rotated, in the example above by the amount of 1 tooth per engine revolution. If however the brake band 18 is tightened up around the casing 14 the resistance offered to rotation by the casing will be greater than the resistance of the sprocket 13 and this will then be turned carrying the road wheel with it.

In a conventional gear box the rotation of the gear assembly described above will cause the oil to be thrown outwardly until the oil content of the gear box assumes roughly the shape of the inner wall of the casing 14. In other words the assembly cleaves a path through the oil and no effective lubrication is obtained. The oil tends to drop down the sides of the casing during rotation and I make use of this fact to improve the lubrication. Adjacent to the end of the shaft 1 there is provided a circular oil thrower 19 having a knife edge 19'. The oil is deflected on to the thrower by deflectors 20 or the like inside the casing. The oil is then thrown outwards from the knife edge 19' into a receiving member 21 of annular shape provided at the edge of the face of the flange 5. The member 21 forms an annular cup to receive the oil thrown out by the thrower 19 and the hood or cover forming the receiving member extends inwardly of the flange 5 beyond the axis of the auxiliary shaft 6. As the oil is thrown outwardly to the receiving member a supply of oil tends to build up inside against the face of the flange 5. Oil ducts 22, 23 are provided by means of which the oil may be carried to the bearings 8 to be lubricated. I attach some importance to the fact that the passageway 22 opens out into the receiving member at the side and not at the bottom since this arrangement minimizes any tendency to clogging of the passageway, dirt and the like can collect in the end of the receiving member at the outside of the plate 5 without causing trouble.

As explained above means may be provided to maintain an adequate supply of oil in the gear box and to this end in an engine using forced lubrication a suitable connection may be made to the gear box.

In order to maintain an adequate supply of oil in the gear box when forced lubrication is not used a connection is provided between the gear box 3 and the crank case 2. In order to achieve this result the crank case 2 is shaped as shown to support the sprocket 13, a suitable bearing 24 being provided and a duct 25 is afforded between the crank case 2 and the shaft 1. If desired a small impeller 26 may be positioned in this duct or passage in order to drive oil laden air along the passage from the crank case to the gear box. A suitable breathing device indicated generally at 27 is provided in order to permit of the escape of air from the gear box to promote the flow of oil laden air along the duct 25.

Referring now to Figure 2 it will be observed that an oil receiving member 21 of increased radius is used and the member is peripherally shaped to provide a chamber 28 in which dirt and sludge may be trapped. The auxiliary shaft 6 which may comprise a bolt or screw threaded member is provided with a longitudinal duct 22 and transverse ducts 23' to pass oil into the bearings.

Referring now to Figure 3 a scoop 30 is disposed within the crank case into which oil is thrown. The oil passes from the scoop 30 down the duct 25 into a tubular member 31 having internal helical grooves or screw threads 32 therein. This member 31 surrounds the driving shaft 1 rotation of which drives the oil along the grooves or threads 32 and into ducts 33 in the sleeve 4. In this way a constant stream of oil flows into the gear box and if no steps were taken to maintain a level there would soon be too much oil in the gear box. In order to remove surplus oil from the gear box therefore a duct 34 is provided in the sleeve 15 which is helically grooved or threaded at 35 and a further duct 36 is provided in the cylindrical member 9. Surplus oil is therefore caused to flow along duct 34, grooves 35 and duct 36 on to the outer surface of the tubular member 31 whence the oil passes back into the crank case through the supporting bearings 37 or a suitably arranged channel 29 as shown.

What is claim is:

1. In a gear box for an engine the combination of a rotatable casing for the gear box, a driving shaft extending from the engine crank case centrally into the gear box, a driven member, co-axial with the driving shaft and projecting from the gear box, a gear wheel assembly on the driving shaft, gear wheel mounted in bearings in said gear wheel assembly, the arrangement being such that the drive may be transmitted either to the rotatable casing for idling or to the driven member for working, oil throwing means on the driving shaft, deflectors on an inner wall of the casing to direct oil on to the oil throwing means, an annular oil receiving cup on the face of the gear wheel assembly positioned to receive oil thrown outwardly by the throwing means, ducts leading from the annular cup to the gear wheel bearings to distribute the oil whereby the oil within the gear box is circulated, oil inlet passages adjacent to the driving shaft connecting the crank case to the gear box whereby oil may pass from the crank case into the gear box to maintain the oil supply in the gear box and oil outlet passages adjacent to the driving shaft connecting the gear box to the crank case whereby excess of oil from the gear box may pass back into the crank case, the said inlet and outlet passages being so arranged that the oil passes into and out of the gear box between the driving shaft and the driven member.

2. In a gear box for an engine the combination of a rotatable casing for the gear box, a driving shaft extending from the engine crank case centrally into the gear box, a driven member, co-axial with the driving shaft and projecting from the gear box, a gear wheel assembly on the driving shaft, gear wheel mounted in bearings in said gear wheel assembly, the arrangement being such that the drive may be transmitted either to the rotatable casing for idling or to the driven member for working, oil throwing means on the driving shaft, deflectors on the inner wall of the casing to direct oil on to the oil throwing means, an annular oil receiving cup on the face of the gear wheel assembly positioned to receive oil thrown outwardly by the throwing means, ducts leading from the annular cup to the gear wheel bearings to distribute the oil whereby the oil within the gear box is circulated, a sleeve mounted on the driving shaft and having an internal spiral groove, passages and ports associated with the groove whereby oil may pass from the crank case to the gear box and further similarly grooved sleeves surrounding the driving shaft having associated ports and passages whereby oil from the gear box may pass from the gear box to the crank case.

3. In a gear box for an engine the combination of a rotatable casing for the gear box, the driving shaft extending from the engine crank case centrally into the gear box, a driven member, coaxial with the driving shaft and projecting from the gear box, a gear wheel assembly on the driving shaft, gear wheel mounted in bearings in said gear wheel assembly, the arrangement being such that the drive may be transmitted either to the rotatable casing for idling or to the driven member for working, oil throwing means on the driving shaft, deflectors on an inner wall of the casing to direct oil on to the oil throwing means, an annular oil receiving cup on the face of the gear wheel assembly positioned to receive oil thrown outwardly by the throwing means, ducts leading from the annular cup to the gear wheel bearings to distribute the oil whereby the oil within the gear box is circulated, oil inlet passages adjacent to the driving shaft connecting the crank case to the gear box whereby oil may pass from the crank case into the gear box to maintain the oil supply in the gear box, oil outlet passages adjacent to the driving shaft connecting the gear box to the crank case whereby excess of oil from the gear box may pass back into the crank case, the said inlet and outlet passages being so arranged that the oil passes into and out of the gear box between the driving shaft and the driven member, and a breathing device whereby differential air pressures in the crank case may be utilised to promote the flow of oil from the crank case to the gear box and vice versa.

4. In a gear box for an engine the combination of a rotatable casing for the gear box, a driving shaft extending from the engine crank case centrally into the gear box, a driven member, coaxial with the driving shaft and projecting from the gear box, a gear wheel assembly on the driving shaft, gear wheel mounted in bearings in said gear wheel assembly, the arrangement being such that the drive may be transmitted either to the rotatable casing for idling or to the driven member for working, oil throwing means on the driving shaft, deflectors on the inner wall of the casing to direct oil on to the oil throwing means, an annular oil receiving cup on the face of the gear wheel assembly positioned to receive oil thrown outwardly by the throwing means, ducts leading from the annular cup to the gear wheel bearings to distribute the oil whereby the oil within the gear box is circulated, a sleeve mounted on the driving shaft and having an internal spiral groove, passages and ports associated with the groove whereby oil may pass from the crank case to the gear box, further similarly grooved sleeves surrounding the driving shaft having associated ports and passages whereby oil from the gear box may pass from the gear box to the crank case, and a breathing device whereby differential air pressures in the crank case may be utilised to promote the flow of oil from the crank case to the gear box and vice versa.

References Cited in the file of this patent

UNITED STATES PATENTS

| Number | Name | Date |
|---|---|---|
| 1,271,140 | Dickey | July 2, 1918 |
| 1,290,626 | Masury | Jan. 7, 1919 |
| 2,027,012 | Barnes | Jan. 7, 1936 |
| 2,111,873 | Sauer | Mar. 22, 1938 |
| 2,229,337 | Neracher | Jan. 21, 1941 |
| 2,408,336 | Orr | Sept. 24, 1946 |